Dec. 25, 1956  G. E. SYKORA  2,775,502
MULTIPLE TRACE RECORDER PENS
Filed Aug. 19, 1953  2 Sheets-Sheet 1

INVENTOR.
GEORGE E. SYKORA
BY
James G. Cleveland.
ATTORNEY

Dec. 25, 1956        G. E. SYKORA        2,775,502

MULTIPLE TRACE RECORDER PENS

Filed Aug. 19, 1953        2 Sheets-Sheet 2

INVENTOR.
GEORGE E. SYKORA
BY
James Y. Cleveland
ATTORNEY

United States Patent Office 2,775,502
Patented Dec. 25, 1956

2,775,502

MULTIPLE TRACE RECORDER PENS

George E. Sykora, Tulsa, Okla., assignor to Well Surveys, Incorporated, Tulsa, Okla., a corporation of Delaware Application August 19, 1953, Serial No. 375,217

5 Claims. (Cl. 346—49)

This invention relates to multiple trace recorders and particularly to pens therefor.

In the recording of information it is frequently desirable to record several phenomena simultaneously. In the event that these phenomena are interrelated, it is often desirable to record them on the same recorder paper. Further, it is often desirable that the traces cross on the recorder paper. The instant invention permits continuous recording while permitting traces to cross. Although the instant invention has general application it will be described in connection with a radioactivity well logging system.

In radioactivity well logging three phenomena are often measured simultaneously, and it is desirable that they be recorded simultaneously as a function of depth on a continuous strip chart recorder of the self-balancing potentiometer type. The phenomena often measured are natural gamma radiation emitted from the formations surrounding a well, gamma radiation induced in the formations by neutron bombardment, and collars connecting the lengths of pipe forming the casing for the well. The casing collar measurements are used as depth indicia and positively mark given depths even though the depth markings on the chart paper are not true. The radioactivity records provide continuous indications of the constitution of the formations and offer evidence of oil-bearing zones. In radioactivity well logging, recorders are used for several hours and then are trucked to a field station remaining idle until another logging service is performed. Intermittent use of the pens permits drying of the ink in the pens, causing clogging. Pens designed for intermittent service must permit easy cleaning of clogged pens. The nature of radioactivity well logging also requires pens that function under varied weather conditions. The instant invention permits easy change of pen tips for changes in the weather and permits easy cleaning.

In recording several channels of information on a single strip chart, it is conventional to use a single self-balancing potentiometer and provide for periodic switching of channels, printing a distinctive mark for each channel. This intermittent type recording is not used in radioactivity well logging, for the nature of the information is such that it must be recorded continuously lest valuable information in one channel be lost while another channel is recording. The recorder of the instant invention utilizes a plurality of recording mechanisms including a plurality of pens. In order that the channels operate at maximum sensitivity on a chart of given width, it is necessary that the pens cross. For pens to continue recording as they cross, they must be displaced from one another in the direction of motion of the chart paper. (This direction is usually vertical and will be so called herein, the direction perpendicular thereto being horizontal.) In radioactivity well logging the detector of each phenomenon is vertically spaced from each other detector in the long narrow subsurface apparatus. The vertical displacement of the pens must be adjusted so that as a detector passes a given horizon in the well, its respective pen is passing the corresponding horizontal line on the chart paper. Since the relative displacements of the pens must be different for different detector spacings and different chart depth scales, the relative displacements in the instant invention are made continuously adjustable over a wide range down to within the width of a trace.

Recorder pens conventionally have a writing tip permanently affixed to a long capillary bringing ink from an ink reservoir. These tips frequently become clogged and a fine wire is inserted in the end of the tip to push the clogging material back into the capillary, whence it may again clog the tip, or back into the reservoir, relatively far to push material through the capillary. In this invention, the pen tip is removable from the capillary, permitting the cleaning of the tip by removing clogging material from the system without pushing it back into the capillary. A further advantage to the removable tip is that the tip may be easily replaced by a tip of another size when required by different recording conditions of recording speed, temperature, humidity, paper type, or ink viscosity, or when a trace of a different width is desired. In the prior art pen tips have been made removable by a threaded screw connection perpendicular to the capillary. The writing point of such tips could not be adjusted to be near another writing point because of the space needed for the connection. In the instant invention, the tip is connected by a friction fit in line with the capillary. This avoids a right angle turn that makes the capillary difficult to clean. The writing point is made to extend farther from the reservoir than any other part, making it possible to approach another writing point very closely.

Therefore, the primary object of this invention is to provide a multiple trace recorder in which the pens may cross and in which the relative displacement of the pens is adjustable. Another object is to provide recorder pens which may be easily cleaned and replaced. Other objects and advantages of the present invention will become apparent from the following detailed description, when considered with the accompanying drawings, in which.

Figure 1:
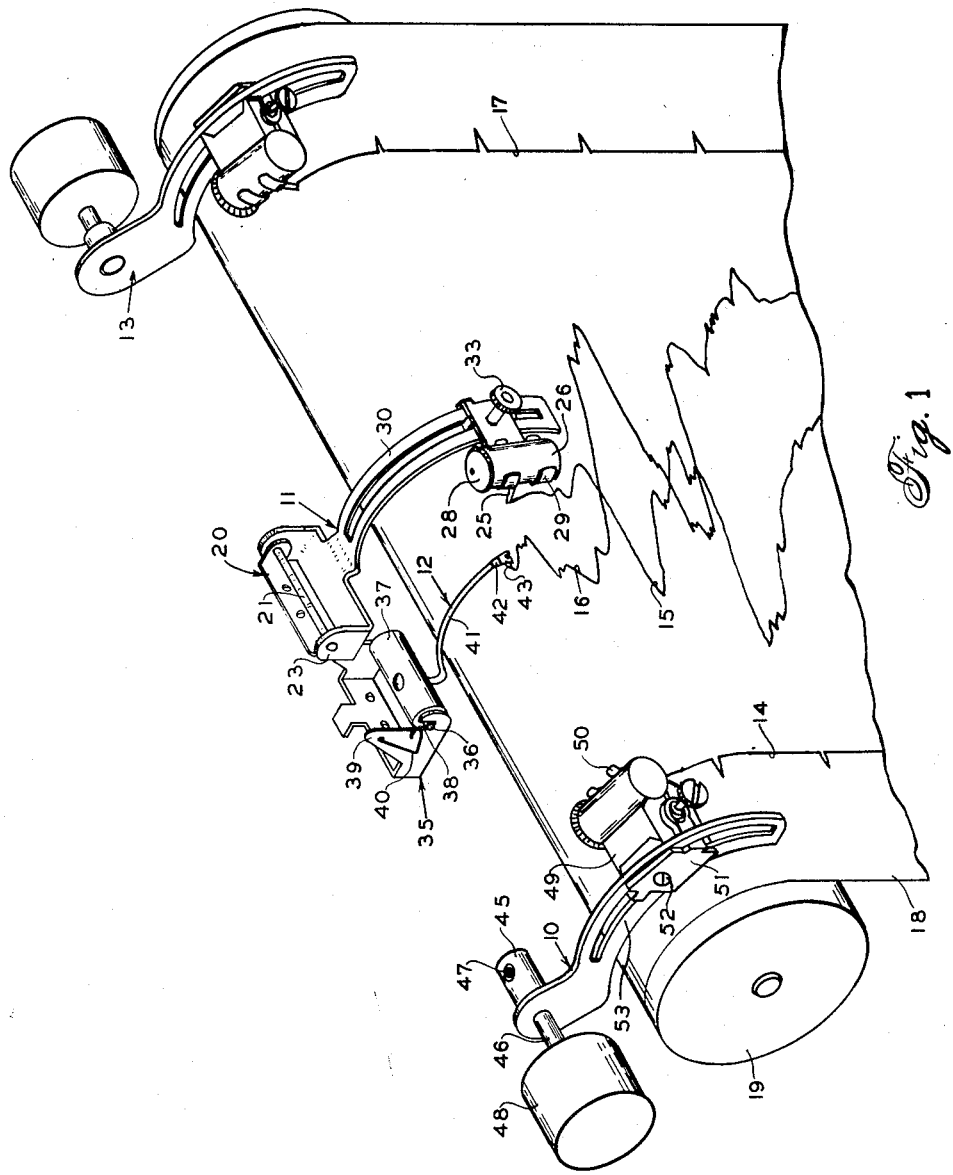
Figure 1 shows the recorder pens for a multiple trace recorder in which the pens may cross and in which the relative displacement of the pens is adjustable.

In recording related information, it is desirable that the records be made simultaneously on a single recorder chart. This may be done by a multiple trace recorder wherein a number of independent self-balancing potentiometers position respective recording pens to produce a plurality of independent traces on a single strip chart. In Figure 1 there is illustrated that part of a multiple trace recorder showing the recording pens used for radioactivity well logging. The remainder of the recorder may be of the conventional type except that each pen has an associated independent system for positioning the pen.

Pen assemblies 10, 11, 12, and 13 are shown making traces 14, 15, 16, and 17, respectively, on strip chart 18 which is driven over roller 19. Pen assemblies 10 and 13 are made from identical parts with the parts assembled differently for operation in opposite margins of the chart.

Figure 2:
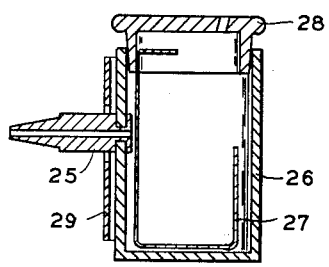
Figure 2 shows a detailed vertical cross-sectional view of the ink cup and pen tip used in the adjustable pen assembly shown in Figure 1.
Figure 3:
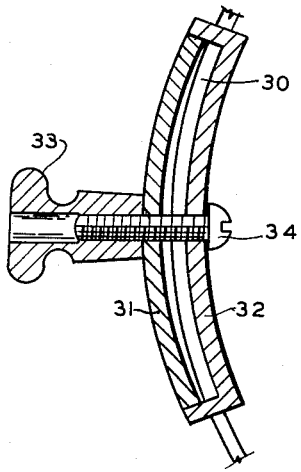
Figure 3 shows in detailed cross-section the clamping mechanism for one of the adjustable pen assemblies shown in Figure 1.

Pen assembly 11 is used in radioactivity well logging to make a neutron log; it records the gamma radiation emitted by the formations while under bombardment from a source of neutrons. Pen assembly 11 is positioned horizontally by pen carriage 20 which is moved in accordance with detected radiation by a self-balancing potentiometer, not shown. Pen assembly 11 is pivotally connected to pen carriage 20 by pin 21 which protrudes through respective holes in ears 23 of the pen assembly. The pen assembly is thus pivoted about an axis parallel to the axis of roller 19. Pen tip 25 is rigidly and permanently secured to cup 26 which functions as an ink reservoir. The size of cup used is determined by the amount of ink required. For greater ink capacity a longer cup of the same diameter may be used with the same apparatus for holding the cup. Pen tip 25 and cup 26 are shown in more detail in cross-section in Figure 2. A capillary is formed between the wall of cup 26 and capillary spring 27. Ink is drawn from the bottom of cup 26 to pen tip 25 down which it flows to the chart paper. Cap 28 closes cup 26 to prevent spilling of the ink; however, it is provided with a breather hole to permit air to enter the cup to replace the ink flowing out. The cap is tapered to provide a friction fit. Cup 26 is held in place by spring clip 29 permitting easy removal of the cup and pen tip unit from pen assembly 11. Spring clip 29 is slidably mounted on curved track 30 and is clamped by the apparatus shown in detail in Figure 3. Clamping plate 31 is made integral with spring clip 29. Track 30 is clamped between clamping plates 31 and 32 by screwing knurled nut 33 on screw 34. The curvature of plate 31 is made greater than the curvature of track 30 in order to put spring in the clamping mechanism and keep nut 33 tight. Track 30 is made approximately concentric with roller 19 in order that pen tip 25 always strikes the paper at the same angle, thus assuring uniform ink application and preventing the pen tip from catching in the paper. As shown in Figure 2, pen tip 25 passes through an aperture in spring clip 29. This prevents the cup 26 from turning in the spring clip 29 and maintains the pen tip 25 in a plane perpendicular to the axis of the roller 19.

Pen assembly 11, as described, is a continuously adjustable, easily replaceable pen assembly. The writing tip position can be continuously adjusted through the arc of the track. The cup and tip are easily secured in clip 29 and just as easily removed. This facilitates cleaning the tip. The short tip is easily cleaned with a fine wire and any obstructions are pushed into cup 26 which is relatively large and easily cleaned when capillary spring 27 is slipped out. Easy removal of the pen cup and tip permits ready exchange in the event that a different size pen tip is needed because of a change in temperature, humidity, ink or paper or for any other reason. Further, a badly clogged pen may be easily replaced and set aside for cleaning at any convenient time.

Figure 4:
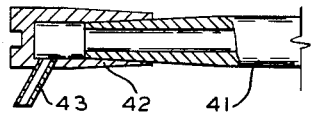
Figure 4 shows a detailed vertical cross-sectional view of the removable pen tip of the fixed pen assembly shown in Figure 1.
Figure 5:
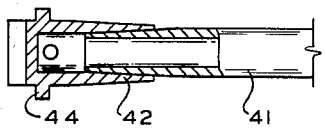
Figure 5 shows another detailed cross-sectional view of said removable pen tip.

Pen assembly 12 is used in radioactivity well logging to make a gamma ray log; it records the gamma radiation naturally emitted by the formations. Pen assembly 12 is positioned horizontally by pen carriage 35 which is moved in accordance with detected radiation by a self-balancing potentiometer, not shown, in the manner that pen carriage 20 was moved by another such potentiometer. Pins 36 on opposite ends of ink reservoir 37 are held in respective notches 38 made in respective ears 39 of pen carriage 35 by springs 40 on the respective ears 39. The fixed ends of springs 40 are rigidly attached to the respective ears 39. The length of springs 40 is sufficient to permit the springs to be pushed aside to insert or remove reservoir 37 without permanent deformation of the springs. The free ends of springs 40 are bent back upon themselves to present sloping surfaces to pins 36 whichever direction they are moved along notches 38. This permits easy removal or insertion of the pen assembly 12. The springs are put in place and fastened while pins 36 are replaced by larger pins. Then when pins 36 are in place, the springs 40 do not touch them. The springs act only when the pen assembly 12 tends to leave the pen carriage because of bouncing of the recorder or motion of the pen carriage. This permits free pivoting of the pen assembly 12 about an axis parallel to the axis of roller 19; the weight of pen assembly 12 keeps its writing point in contact with the chart paper 18. Capillary 41 carries ink from reservoir 37 to cap 42 in which pen tip 43 is soldered. Pen tip 43 and cap 42 are shown in detail in Figure 4. The inner surface of cap 42 and the outer surface of capillary 41 are tapered to provide a snug friction fit. A friction fit is better than a screw fit for it permits adjustment of the pen tip to lie in a plane perpendicular to the chart paper; a screw fit would put the pen tip in whatever position it happened to be in when the screw fit was snug. Cap 42 is provided with a slot to aid in removing the pen cap and tip. The slot is perpendicular to the pen tip in order to aid in aligning the pen tip; when the slot is horizontal, the pen tip is in the proper position. In Figure 5 there is shown another view of pen cap 42, showing shoulder 44 which aids in removal of the pen cap and tip.

The pen tip 43 is easily removed from the pen assembly 12 by parting the friction fit between cap 42 and capillary 41. This permits quick replacement of the pen tip during logging. The removable tip is easily cleaned with a fine wire without having to push the clogging material through the relatively long capillary 41. Further, the removable tip is easily replaced should another size be required by a change in temperature, humidity, ink or paper or for any other reason. A clogged pen may be replaced during logging and set aside for cleaning at a more convenient time. Ink is put into reservoir 37 through a filling hole which is placed opposite the capillary 41 to facilitate cleaning of the capillary. Cap 42 is removed in line with the capillary 41; since there are no sharp bends in the capillary, it is easily cleaned. The cap 42 is of small size, permitting pen assembly 12 to pass under pen assembly 11 while recording. Pen tip 43 extends farther from the reservoir 37 than any other part to permit pen tip 43 to approach tip 25 of pen assembly 11 closely so that pen assemblies 11 and 12 may write within the width of a trace apart.

Figure 6:
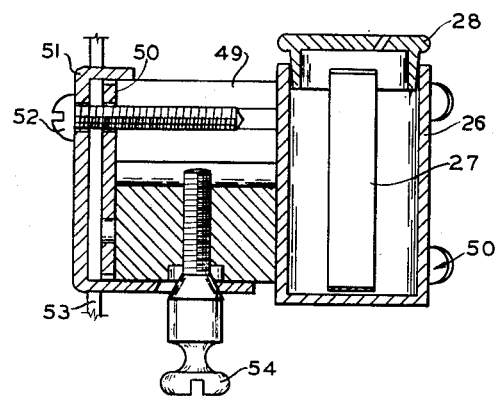
Figure 6 shows a detailed vertical cross-sectional view of the clamping mechanism of the other type of adjustable pen assembly shown in Figure 1.
Figure 7:
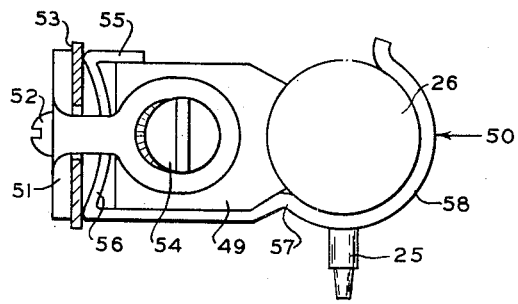
Figure 7 shows a detailed view perpendicular to the view of Figure 6.

Pen assembly 10 is used in radioactivity well logging to make a record of casing collars in the margin of chart paper 18. Collar 45 of the pen assembly 10 is held rigidly on shaft 46 by set screw 47. Shaft 46 freely rotates about an axis parallel to the axis of roller 19. Shaft 46 is moved horizontally by solenoid 48 whenever the collar locator detector unit passes a collar in the well casing. This moves pen assembly 10 horizontally and produces a pip on trace 14 as a record of the collar. Solenoid 48 is rigidly mounted on the recorder frame, not shown. Cup 26, pen tip 25 and cap 28, used in pen assembly 11, may be similarly used in pen assembly 10. Cup 26 is held against clamping block 49 by spring clip 50. Clamping plate 51 and screw 52 slidably mount the clamping block on track 53. Clamping block 49 is tapped to admit screw 52 and then slit and deformed in order that screw 52 be held in position by friction. The clamping mechanism is shown in detailed vertical section in Figure 6. Thumb screw 54 has a conical section which engages a beveled edge on clamping plate 51. As screw 54 is tightened, track 53 is clamped between clamping plate 51 and clamping block 49. Thumb screw 54 is located at the bottom of the pen assembly to facilitate clamping, since it is then readily accessible when the unit is clamped near the top of the track, which is the normal position because the collar locator is normally the top detector in the subsurface instrument. Spring clip 50 is shown horizontally in detail in Figure 7. Spring clip 50 comprises clamping block spring 55, mounting spring 56, detent 57, and cup spring 58. Clamping block 49 is held by spring tension between clamping block spring 55 and detent 57. Cup spring 58 holds cup 26 against clamping block 48. Mounting spring 56 is a curved portion of spring clip 50 that exerts a force against track 51 when screw 52 is not snug, producing friction to hold the cup 26 in position on track 51 yet permit it to be slid along track 51 until thumb screw 54 is tightened. Except for the clamping mechanism, pen assembly 10 is similar to pen assembly 11 and has similar virtues as a continuously adjustable, easily replaceable pen assembly.

Pen assembly 13 is also a margin pen assembly. Normally only three pens are used in radioactivity well logging. However, a second margin pen may sometimes be useful, as for making a time record. Further, it is sometimes desirable to mount the collar locator pen assembly on the right side of the recorder. The same parts used to make pen assembly 10 may be assembled to make pen assembly 13.

In combination pen assemblies 10, 11, and 12 constitute the writing mechanisms for a multiple trace recorder adapted for use in radioactivity well logging. Pen assembly 10 makes a marginal trace indicating the location of casing collars. This provides depth markings relating to permanent markers fixed in the hole. Pen assemblies 11 and 12 make neutron and gamma ray traces respectively. All of the pen assemblies are relatively adjustable, pen assembly 12 being fixed, pen assemblies 10 and 11 being adjustable over wide ranges. The collar locator and the neutron and gamma ray detectors are spaced apart in the subsurface logging instrument. Pen assemblies 10, 11, and 12 are spaced proportionately according to the ratio of chart displacement to displacement in the well. Thus as the detector passes a given horizon in the well its respective pen passes the corresponding horizon on the chart paper. The relative displacement of the pens in adjustable for different detector spacings and different chart scales. The pen cups and tips of pen assemblies 10 and 11 are easily removable for replacement or cleaning. The tip 43 and cap 42 on pen assembly 12 on the end of a long capillary are relatively small so that they may pass under cup 26 of pen assembly 11 and are easily removable for exchange or cleaning of the tip. Pen assemblies 11 and 12 may both traverse the entire chart width. Pen assembly 12 may pass under pen assembly 11 even when the respective pen tips are within the width of a trace apart.

Although this invention has been described for use in radioactivity well logging, it is to be understood that this invention has general application and is not to be limited to the specific modifications described but is to be limited only by the following claims.

I claim:

1. A multiple trace recorder having a support; roller platen means mounted on said support having a surface adapted to support succeeding portions of a strip chart; a plurality of pen carriages individually mounted on said support for motion substantially parallel to the axis of said platen in independent response to respective signals; a plurality of pen assemblies for mounting on respective pen carriages at least one of which assemblies comprises an arcuate pen track, an ink cup mounted on said track for sliding movement thereon, means to fix said cup in a desired position of adjustment on said track, and a writing tip affixed to said ink cup; and means for pivotally mounting said track upon one of said pen carriages with bias toward said platen and with said track substantially concentric to the chart supporting surface thereof to hold said writing tip in writing relation against a portion of chart on said platen.

2. A strip chart recorder having a support; roller platen means mounted on said support having a surface adapted to support succeeding portions of a strip chart; a pen carriage mounted on said support for motion substantially parallel to the axis of said platen in response to a signal; a pen assembly comprising an ink reservoir, an ink tube rigidly fixed to said ink reservoir and having a tapered free end, a removable cap tapered with a substantially mating taper and thereby frictionally held directly to said tube, and a writing tip emerging from said cap whereby said writing tip may be removed with said cap from said tube; and means for pivotally mounting said ink reservoir on said pen carriage with bias of said ink tube toward said platen to hold said writing tip in writing relation against a portion of chart on said platen.

3. A strip chart recorder having a support; roller platen means mounted on said support having a surface adapted to support succeeding portions of a strip chart; a pen carriage mounted on said support for motion substantially parallel to the axis of said platen in response to a signal; a pen assembly comprising an ink reservoir, an ink tube rigidly fixed to said ink reservoir and having a tapered free end, a removable cap tapered with a substantially mating taper and thereby frictionally held directly to said tube, and a writing tip emerging from said cap at a relatively large obtuse angle from said taper to permit the insertion of a cleaning wire without a sharp bend whereby said writing tip may be removed with said cap from said tube; and means for pivotally mounting said ink reservoir on said pen carriage with bias of said ink tube toward said platen to hold said writing tip in writing relation against a portion of chart on said platen.

4. A multiple trace recorder having a support; roller platen means mounted on said support having a surface adapted to support succeeding portions of a strip chart; a plurality of pen carriages individually mounted on said support for motion substantially parallel to the axis of said platen and relatively displaced in a direction transverse to their direction of motion; a first pen assembly comprising an arcuate pen track, an ink cup mounted on said track for sliding movement thereon, means to fix said cup in a desired position of adjustment on said track, and a first writing tip affixed to said ink cup; means for pivotally mounting said track upon one of said pen carriages with bias toward said platen and with said track substantially concentric to the chart supporting surface thereof to hold said first writing tip in writing relation against a portion of chart on said platen; a second pen assembly comprising an ink reservoir, an ink tube rigidly fixed to said ink reservoir and having a tapered free end and of such size and curvature as to be able to pass between said pen track and said platen, a removable cap tapered with a substantially mating taper and thereby frictionally held directly to said tube, and a second writing tip emerging from said cap whereby said second writing tip may be removed with said cap from said tube; means for pivotally mounting said ink reservoir on said pen carriage with bias of said ink tube toward said platen to hold said second writing tip in writing relation against a portion of chart on said platen, said second writing tip extending further in the direction of chart motion than any other part of said pen assembly; and means for moving said pen carriages independently in response to respective signals so that said first and second writing tips may draw traces which cross each other on said chart.

5. A multiple trace recorder having a support; roller platen means mounted on said support having a surface adapted to support succeeding portions of a strip chart; a plurality of pen carriages individually mounted on said support for motion substantially parallel to the axis of said platen and relatively displaced in a direction transverse to their direction of motion; a first pen assembly comprising an arcuate pen track, an ink cup mounted on said track for sliding movement thereon, means to fix said cup in a desired position of adjustment on said track, and a first writing tip affixed to said ink cup; means for pivotally mounting said track upon one of said pen carriages with bias toward said platen and with said track substantially concentric to the chart supporting surface thereof to hold said first writing tip in writing relation against a portion of chart on said platen; a second pen assembly comprising an ink reservoir, an ink tube rigidly fixed to said ink reservoir of such size and curvature as to be able to pass between said pen track and said platen, and a second writing tip mounted in ink receiving relation upon said ink tube; means for pivotally mounting said ink reservoir on said pen carriage with bias of said second writing tip toward said platen to hold said second writing tip in writing relation against a portion of chart on said platen; and means for moving said pen carriages independently in response to respective signals so that said first and second writing tips may draw traces which cross each other on said chart.

References Cited in the file of this patent

UNITED STATES PATENTS

| | | |
|---|---|---|
| 639,180 | Martin | Dec. 12, 1899 |
| 980,534 | Kerr | Jan. 3, 1911 |
| 1,573,339 | Watts | Feb. 16, 1926 |
| 1,720,226 | Lovejoy | July 9, 1929 |
| 2,176,777 | Tate | Oct. 17, 1939 |
| 2,330,082 | Side et al. | Sept. 21, 1943 |
| 2,600,822 | Yarnall et al. | June 17, 1952 |
| 2,673,138 | Bartley et al. | Mar. 23, 1954 |